United States Patent
Kim et al.

(10) Patent No.: US 12,340,561 B2
(45) Date of Patent: Jun. 24, 2025

(54) VIDEO RETRIEVAL SYSTEM USING OBJECT CONTEXTUALIZATION

(71) Applicant: KYONGGI UNIVERSITY INDUSTRY AND ACADEMIA COOPERATION FOUNDATION, Seongnam-si (KR)

(72) Inventors: Kwang Hoon Kim, Suwon-si (KR); Dinh Lam Pham, Suwon-si (KR)

(73) Assignee: KYONGGI UNIVERSITY INDUSTRY AND ACADEMIA COOPERATION FOUNDATION, Seongnam-si (KR)

( * ) Notice: Subject to any disclaimer, the term of this patent is extended or adjusted under 35 U.S.C. 154(b) by 368 days.

(21) Appl. No.: 18/086,660

(22) Filed: Dec. 22, 2022

(65) Prior Publication Data

US 2024/0212324 A1 Jun. 27, 2024

(51) Int. Cl.
*G06K 9/00* (2022.01)
*G06F 16/732* (2019.01)
*G06F 16/783* (2019.01)
*G06V 10/70* (2022.01)
*G06V 20/40* (2022.01)

(52) U.S. Cl.
CPC ........ *G06V 10/768* (2022.01); *G06F 16/7335* (2019.01); *G06F 16/7837* (2019.01); *G06V 20/41* (2022.01); *G06V 20/46* (2022.01)

(58) Field of Classification Search
CPC ...... G06V 10/768; G06V 20/41; G06V 20/46; G06F 16/7335; G06F 16/7837
See application file for complete search history.

(56) References Cited

U.S. PATENT DOCUMENTS

| | | | |
|---|---|---|---|
| 11,527,000 B2 | 12/2022 | Kim et al. | |
| 2013/0132311 A1* | 5/2013 | Liu | G06V 10/774 706/12 |
| 2019/0278435 A1* | 9/2019 | Santisteban | G06F 3/0482 |
| 2020/0159823 A1 | 5/2020 | Lam et al. | |
| 2021/0089780 A1* | 3/2021 | Chang | A63F 13/60 |
| 2022/0180127 A1* | 6/2022 | Chen | G06V 20/47 |
| 2024/0045904 A1* | 2/2024 | Tiwari | G11B 27/036 |
| 2024/0144489 A1* | 5/2024 | Nguyen | G06T 7/246 |

FOREIGN PATENT DOCUMENTS

KR  10-2021-0094784 A  7/2021

OTHER PUBLICATIONS

Non-final Office Action dated Oct. 24, 2024 from the Korean Patent Office for Application No. 10-2022-0028968.

* cited by examiner

*Primary Examiner* — Dhaval V Patel
(74) *Attorney, Agent, or Firm* — Insight Law Group, PLLC; Seung Lee (57) ABSTRACT

A search system using object contextualization according to an aspect of the present disclosure stores object contextualization data obtained by contextualizing a detected object and attribute information of the object with respect to one or more video files for each frame, in the form of a text file in a big data storage, and searches for a video that meets a search condition with respect to the stored object contextualization data.

11 Claims, 8 Drawing Sheets

```
⊟Frame_10
  ├─□ ID : 10
  ├─□ File : "FILE₁"
  ⊟DetectedObjsDict
  │   ├─□ person : 13
  │   └─□ car : 1
  ⊟Detail
    ⊞object_1
    ⊞object_2
    ⊞object_3
    ⊞object_4
    ⊞object_5
    ⊞object_6
    ⊞object_7
    ⊟object_8
      ├─□ id : 8
      ├─□ class : "car"
      ├─□ confidence : 0.53759765625
      ⊟ location
      │   ├─□ 0 : 1
      │   ├─□ 1 : 556
      │   ├─□ 2 : 242
      │   └─□ 3 : 856
      ⊟ properties
          └─□ color : "undetected"
    ⊞object_9
    ⊞object_10
    ⊞object_11
    ⊞object_12
    ⊞object_13
    ⊞object_14
```

VIDEO RETRIEVAL SYSTEM USING OBJECT CONTEXTUALIZATION

BACKGROUND

1. Field

The following description relates to computer vision technology, and particularly, to a technology of contextualizing objects detected in a 2D image, storing the contextualized objects in the form of text, and performing a text-based search.

2. Description of Related Art

Recently, available video data collected from closed circuit televisions (CCTVs), black boxes, smartphones, etc., and unstructured data produced from social media such as Facebook have been rapidly increasing, and the rate of the increase has also been rapidly accelerating. Accordingly, interest in the convergence approach between unstructured content big data of videos and social media and artificial intelligence technologies such as deep learning and various utilization methods based on this is greatly spreading. In particular, as research and development and commercialization of artificial intelligence disclosure engines such as deep learning, which utilize video and social media big data of unstructured content as learning and training data, and service platforms that utilize the artificial intelligence disclosure engines, are beginning to attract attention, interest in research and development that applies artificial intelligence technologies such as deep learning to video search systems, which are representative unstructured content big data application services, is increasing.

Video search systems according to the related art based on physical contents and semantic objects of video frames do not show sufficient performance to configure frame indexes or extract core features. Some approaches, even if they show relatively good performance, have problems that the dimensions of the extracted feature are too high or the implementation of the corresponding algorithm is very difficult. The most important step in the video search approaches and systems is a feature extraction step to describe the corresponding video with the minimum descriptor, and color and texture are mainly considered as the most basic visual features. Recently, research and development on video object-based video search approaches and content-based video search approaches based on pattern recognition and computer vision according to various texture expression methods have been significantly on the rise.

In particular, in the case of CCTV video analysis that continuously generates video data, many computing resources are required to store and analyze the video itself.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a system for searching for a video based on text by contextualizing an object appearing in the video and attributes of the object and storing the contextualized object and attributes in the form of text.

In addition, the following description relates to a system for searching even for a video that has been deleted due to expiration of a storage period, reconfiguring the searched video into images of detected objects, and reproducing the images.

A video search system using object contextualization according to an aspect of the present disclosure includes an object contextualization server and a video search server.

The object contextualization server may detect an object for each frame from an input video file, generate frame contextualization data including types and the number of objects detected for each frame, object attribute information, and object location information, and combine the frame contextualization data to generate object contextualization data for video data and store the generated data in a big data storage as a text file.

The video search server may search for a video that meets a search condition based on a text search with respect to the object contextualization data after receiving the search condition.

Specifically, the video search server according to an aspect of the present disclosure may include a front end unit and a back end unit.

The front end unit may provide a user interface for inputting the search condition and a user interface for displaying a search result.

The back end unit may search for a video based on a condition input with respect to text files in which the object contextualization data is stored.

According to an additional aspect of the present disclosure, the front end unit of the video search server may further include a user interface for re-searching for a video with respect to a video search result after receiving the search condition.

According to an additional aspect of the present disclosure, the front end unit of the video search server may further provide a user interface for receiving a list of video files to be searched and transmitting the list to the object contextualization server. In this case, the object contextualization server may perform object contextualization on the video files belonging to the received list of the video files.

In addition, the back end unit may search for the video with respect to only the object contextualization data generated from the video files belonging to the input list of the video files.

Specifically, the object contextualization server according to an aspect of the present disclosure may include an input video processing unit, an object detection unit, a frame contextualization unit, an object contextualization unit, and a contextualization storage unit.

The input video processing unit may generate input video data by assigning consecutive frame identifiers to each frame of one or more video files.

The object detection unit may use a deep learning model to detect a plurality of objects for each frame in the input video data and classify the type of the object, and may generate object attribute information including the type of the object and location information of the object.

The frame contextualization unit may generate frame contextualization data including frame information detected for each frame in which the object is detected, the types and number of objects, and object attribute information of each object.

The object contextualization unit may generate object contextualization data including a list of the detected objects and the frame contextualization data for each frame.

The contextualization storage unit may store the object contextualization data in a big data storage as a text file.

According to an additional aspect of the present disclosure, the object contextualization server may further include a clip designation unit, and the clip designation unit may configure a logical clip based on predetermined clip configuration information and add the configured result to the object contextualization data.

According to an aspect of the present disclosure, the frame contextualization unit of the object contextualization server may generate frame contextualization data for each frame at a predetermined frame interval, or may generate, when the types and number of objects detected for a current frame are different from the types and number of objects detected for a previous frame, frame contextualization data for the current frame.

According to an aspect of the present disclosure, the object attribute information included in the frame contextualization data generated by the object contextualization server may further include an object image in the corresponding frame. In this case, when the video file searched by the video search server is deleted, a restored video file may be generated by combining object images included in the object attribute information.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Foregoing and additional aspects are embodied through embodiments described with reference to the accompanying drawings. It is understood that the components of each embodiment are possible in various combinations within one embodiment unless otherwise stated or contradictory to each other. Each block in the block diagram may represent a physical component in some cases, but in another case, it may be a logical representation of some of functions of one physical component or functions over multiple physical components. Sometimes the substance of a block or a portion thereof may be a set of program instructions. All or some of these blocks may be implemented by hardware, software, or a combination thereof.

Figure 1:
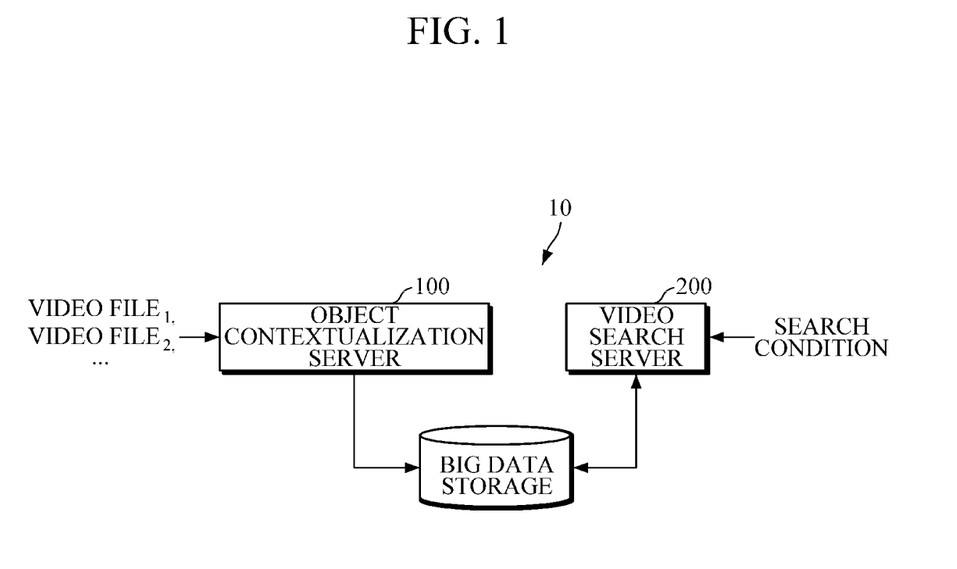
FIG. 1 is a block diagram illustrating a video search system using object contextualization according to the present disclosure.

FIG. 1 is a block diagram illustrating a video search system using object contextualization according to the present disclosure. A video search system 10 using object contextualization according to an aspect of the present disclosure includes an object contextualization server 100 and a video search server 200.

The object contextualization server 100 and the video search server 200 may be composed of one computing device or a plurality of computing devices connected through a network, and include a concept of software in addition to hardware. That is, the object contextualization server 100 and the video search server 200 may refer to physical hardware, but may also refer to server programs executed on the corresponding hardware. A computing device constituting servers is a device including a processor and a memory connected to the processor and including program instructions executable by the processor. The corresponding computing device may be a computer device that further includes a storage device, a display, an input device, and the like in addition to the processor and the memory. The processor is a processor that executes program instructions for implementing server programs, and the memory is connected to the processor and stores program instructions executable by the processor, data to be used for operation by the processor, data processed by the processor, and the like.

The object contextualization server 100 detects an object for each frame from an input video file, generates frame contextualization data including the types and number of objects detected for each frame, object attribute information, and location information of the object, combines the frame contextualization data to generate object contextualization data for video data, and stores the object contextualization data as a text file in a big data storage.

Figure 2:
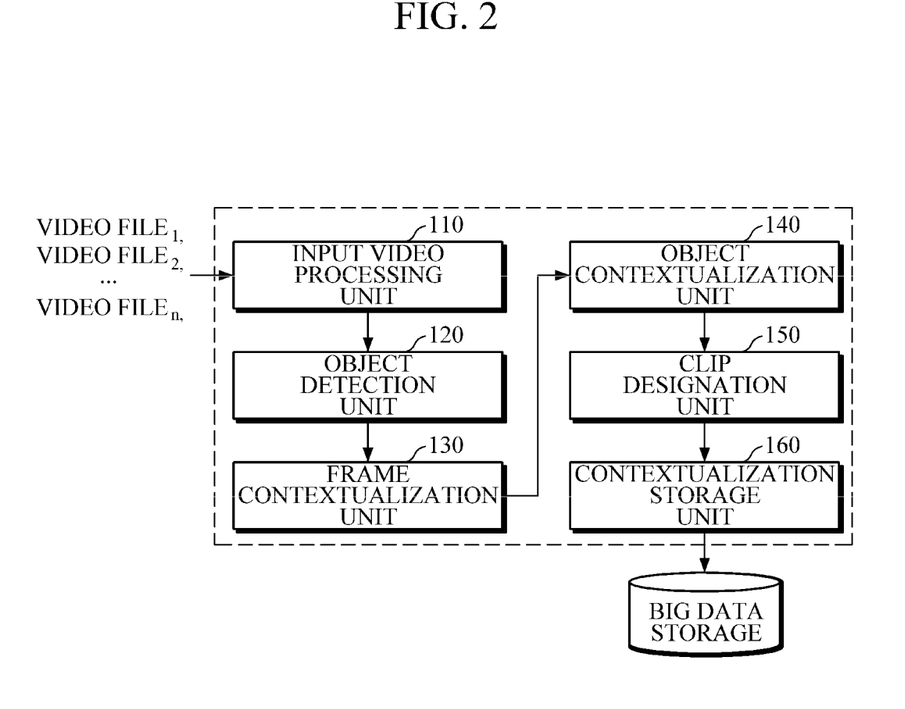
FIG. 2 is a block diagram illustrating an object contextualization server according to the present disclosure.

Specifically, the object contextualization server 100 according to an aspect of the present disclosure may include an input video processing unit 110, an object detection unit 120, a frame contextualization unit 130, an object contextualization unit 140, and a contextualization storage unit 160.

The respective functional blocks of the object contextualization server 100, that is, the input video processing unit 110, the object detection unit 120, the frame contextualization unit 130, the object contextualization unit 140, and the contextualization storage unit 160 may be included and configured in one physical hardware, that is, a computing device, or each of the functional blocks may be configured as two or more computing devices by combining different computing devices or functional blocks.

Figure 3:
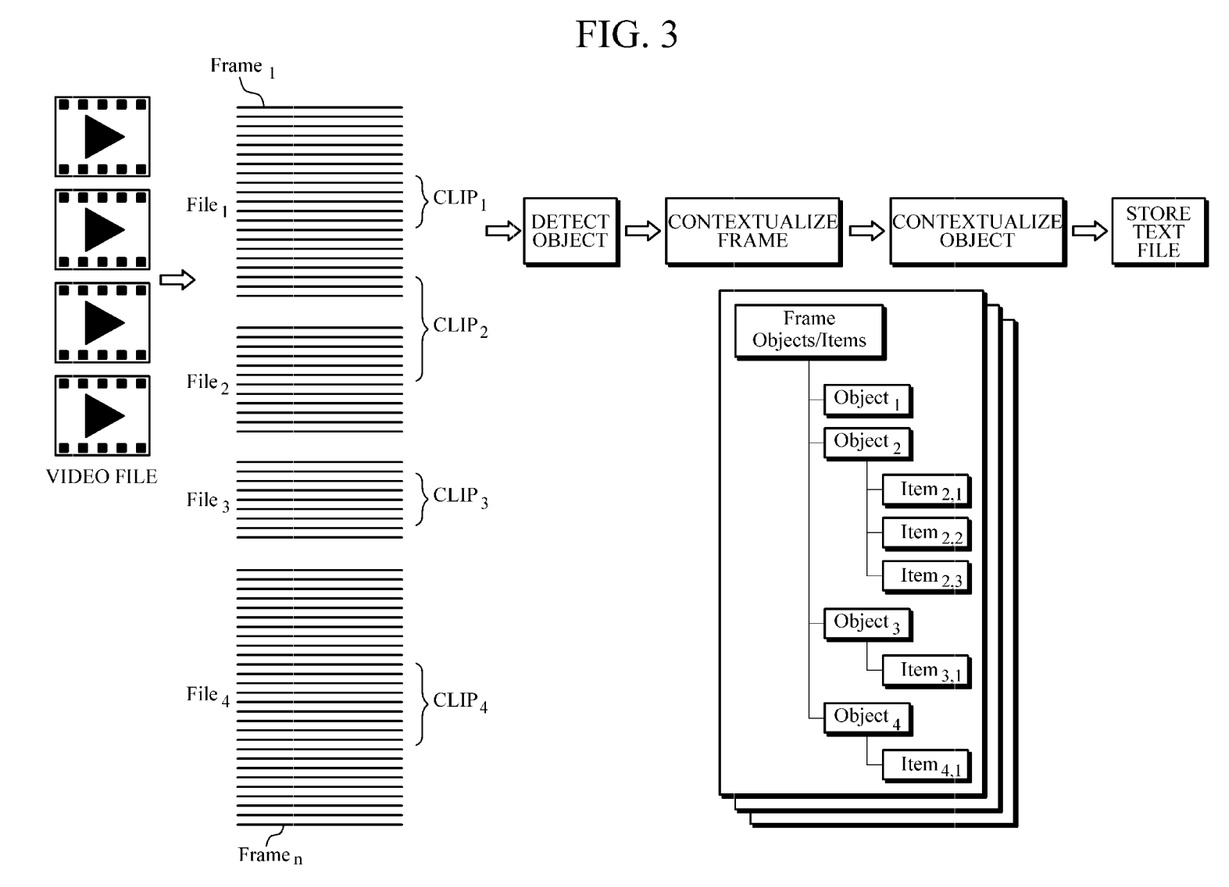
FIG. 3 illustrates the concept of contextualizing an object by an object contextualization server according to the present disclosure.

FIG. 3 illustrates the concept of contextualizing an object by an object contextualization server according to the present disclosure. Referring to the concept of object contextualization with reference to FIG. 3, the object contextualization server 100 may receive and process one or more video files such as closed circuit television (CCTV) videos.

In the example of FIG. 3, four video files are input. The four video files may be related video files. For example, the four video files may be video files that are continuously photographed and stored by one CCTV camera or video files that are photographed and stored by four CCTV cameras located in the same area at similar times.

In the example of FIG. 3, the object contextualization server 100 arranges the four input video files in the input order and assigns new frame identifiers (IDs) to all video files (from FRAME₁ to FRAMEₙ) to generate one input video data. The object contextualization server 100 detects an object for each frame from all frames of the input video data. The object contextualization server 100 generates frame contextualization data by structuring object information (the type of the object and attribute information of the object) detected for each frame.

In the example of FIG. 3, the frame contextualization data is an object, and attribute thereof is structured as an item. The object contextualization server 100 generates object contextualization data for the input video data by combining the frame contextualization data structured for each frame.

At least some of functions of the input video processing unit 110, the object detection unit 120, the frame contextualization unit 130, the object contextualization unit 140, and the contextualization storage unit 160 may be implemented by computer program instructions to be stored in the memory and executed by the processor.

The input video processing unit 110 generates input video data by assigning consecutive frame IDs to the respective frames of the one or more input video files. The input video processing unit 110 arranges the one or more input video files in the input order and sequentially allocates new frame IDs to all the video files to generate the one or more input video files as one piece of input video data.

The object detection unit 120 detects an object for each frame from the input video data using a deep learning model trained to detect objects in the video. The object detection unit 120 detects a plurality of objects at once in every frame. The deep learning model used by the object detection unit 120 may be trained using a known data set such as a Common Objects in Context (COCO) data set.

The object detection unit 120 classifies the detected objects, predicts types of the objects, and predicts location information of the objects in the video using a bounding box.

In addition, the object detection unit 120 generates object attribute information including the types of objects classified for each frame and the location information of the corresponding object in the video. The object attribute information generated by the object detection unit 120 includes location information of the object, that is, object size information calculated from bounding box coordinates, object classification confidence, object color (e.g., the color of a car if the object is the car). For example, when the detected object is a person and the gender is recognized, the object detection unit 120 may add and generate the gender of the person as object attribute. The object attribute generated by the object detection unit 120 is not limited to those mentioned above and may be added in various ways according to attributes recognizable in the video as needed.

The deep learning model used by the object detection unit 120 to detect the object may be configured to be selectable. A user may select an object detection deep learning model through a user interface provided by the object contextualization server 100. The object contextualization server 100 may further include a front end unit (not shown) providing a user interface. However, the corresponding deep learning model may output a result in a prearranged format so that the object detection unit 120 can use the object detection result.

The deep learning model used by the object detection unit 120 to detect the object may be a deep learning model using a single-step method algorithm. The deep learning model using a single-step method includes a you only look once (YOLO) model, a single shot multi-box detector (SSD) model, and a RetinaNet model, and may use the YOLO model. The single-step method algorithm is known to exhibit superior performance than a two-step method algorithm in terms of speed.

The YOLO model is a real-time object detection model that is most popularly used in the field of object detection and will be briefly described as a known technique. The YOLO model extracts an absolute size and location of each object in the form of coordinates from a camera video. The YOLO model may receive 2D image data from the camera video, may use a convolution layer to extract the absolute size and location of the object in the form of coordinates, and may determine a type of the object. In general, YOLO is constituted of multiple convolutional layers and fully connected layers to extract features of an image. The fully connected layer determines the location and type of the object from the extracted result.

The SSD model will also be briefly described as a known technique. The SSD model uses VGG-16 as a backbone, but extracts features using only some convolution layers, and the extracted features perform object detection by passing through several auxiliary detectors. YOLO has bounding box and classification information only in the final feature map, whereas SSD has information distributed in several hidden layers. SSD has 6 layers corresponding to feature maps of different sizes. A large feature map may detect small objects and A small feature map may detect large objects. SSD is an algorithm that predicts a single object using bounding boxes of various sizes.

The RetinaNet model will also be briefly described as a known technique. The RetinaNet model uses a focal loss function transformed from a cross entropy loss function. The RetinaNet model uses ResNet as a backbone and applies feature pyramid networks (FPN). ResNet, a backbone network, serves to calculate feature maps for all input images. The RetinaNet model includes two subnetworks, wherein the first subnetwork performs object classification on the results of ResNet and the second subnetwork performs bounding box regression.

The deep learning model used by the object detection unit 120 to detect the object may be a deep learning model using a two-step method algorithm. The deep learning model using the two-step method includes a Faster Region-based Convolutional Neural Network (R-CNN) model and Region-based Convolutional Network (R-FCN) model, and may use the Faster R-CNN model. The two-step method algorithms are known to exhibit superior performance than the single-step method algorithm in terms of accuracy.

The Faster R-CNN model and the R-FCN model will be briefly described as known techniques.

The Faster R-CNN model is a structure in which a region proposal network (RPN), which performs candidate region extraction, is added to solve the bottleneck caused by a selective search algorithm used for candidate region extraction. Faster R-CNN is a combination of RPN and Fast R-CNN. The Faster R-CNN model obtains a feature map by inputting an original image to a pre-trained CNN model, and transmits the feature map to RPN to calculate an appropriate candidate region (region proposals). After obtaining a feature map with a fixed size by performing Region of Interest (RoI) pooling on the feature map obtained through the candidate region calculation process and the CNN model, object classification and bounding box prediction are performed by inputting the feature map with the fixed size to the Fast R-CNN mode.

The R-FCN model has a structure in which operations are shared between RoIs extracted through RPN and a feature map including location information is used. The R-FCN model is used by modifying the subnetwork at the post-RPN stage in the Faster R-CNN model into a fully convolutional network (FCN).

The frame contextualization unit 130 generates frame contextualization data including frame information detected for each frame in which an object is detected, the types and number of objects, and object attribute information of each object. The frame contextualization unit 130 generates the frame contextualization data for each frame by structuring information including the types and number of objects detected and classified in the video frame data and object attribute information of each object.

Figure 4:
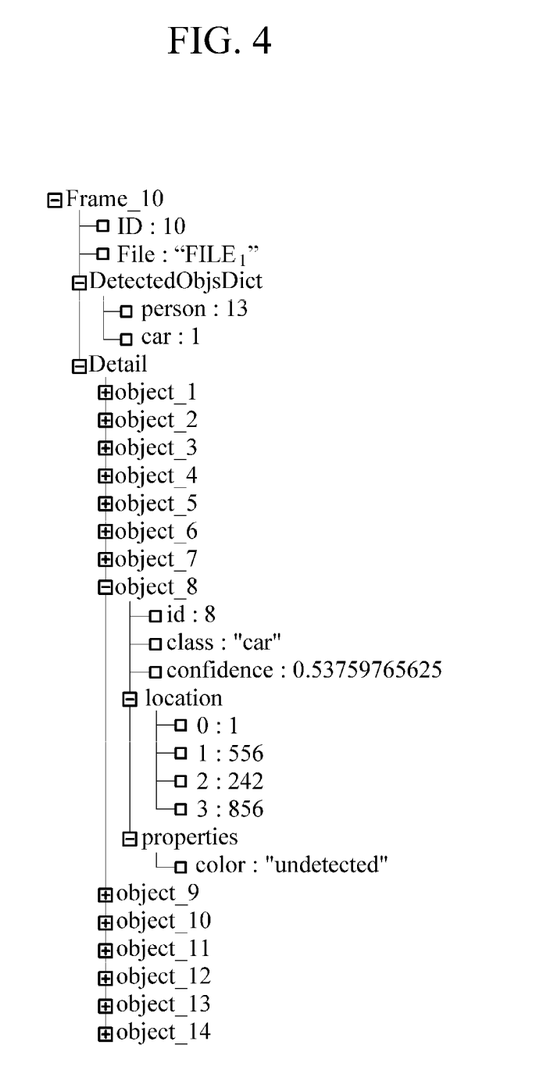
FIG. 4 illustrates an example of frame contextualization structured for one frame by an object contextualization server according to the present disclosure.

FIG. 4 illustrates an example of frame contextualization structured for one frame by an object contextualization server of the present disclosure. The example shown in FIG. 4 assumes frame contextualization data for frame #10, and the frame contextualization data includes a frame ID, types and the number of objects detected in a frame (DetectedObjsDict), and object attribute information (object_#) of an individual object. The frame ID classifying frames in input video data is 10, the types of object detected in the corresponding frame are a person and a car, 13 people appear and one car appear, which are structured in DetectedObjsDict item, and each object included in the frame contextualization data is structured from object_1 item to object_14 item. Here, an object structured in object_8 item is an object classified as a car, and classification confidence and object location information are included as the object attribute information to generate the corresponding object as frame contextualization data. The example shown in FIG. 4 is one example, and object attribute information may be added in various ways according to the type of object.

According to another aspect of the present disclosure, the frame contextualization unit 130 may generate frame contextualization data for frames sampled at a predetermined frame interval. For example, when the predetermined frame interval is 5, the frame contextualization unit 130 may generate frame contextualization data only for frames corresponding to the predetermined frame interval, such as the $5^{th}$ frame, the $10^{th}$ frame, and the $15^{th}$ frame.

According to another aspect of the present disclosure, the frame contextualization unit 130 may not generate, when the types and number of objects detected for a current frame are the same as the types and number of objects detected for a frame in which frame contextualization data was previously generated, the frame contextualization data for the current frame. That is, the frame contextualization unit 130 may generate frame contextualization data for the current frame when the types and number of objects detected for the current frame are different from the types and number of objects detected for the previous frame.

The object contextualization unit 140 generates object contextualization data including a list of objects detected for the input video data and the frame contextualization data for each frame. The object contextualization unit 140 generates a list of all objects detected in at least one frame of the input video data, combines the generated list with frame contextualization data of the frames in which the objects are detected, and structures the combined data.

The contextualization storage unit 160 stores the object contextualization data for the input video data as a text file in a big data storage. The contextualization storage unit 160 stores the text file in which the object contextualization data generated for the video is stored in the big data storage inside the device or transmits the text file to a cloud-based big data storage and stores the text file. The big data storage may be, for example, a storage using a Hadoop distributed file system or a storage using not-only Structured Query Language (NoSQL).

According to an aspect of the disclosure, the contextualization storage unit 160 may store the list of detected objects and the object contextualization data for each frame as the text file in the form of a JavaScript Object Notation (JSON) file. A JSON file is a format that has the advantage of easily exchanging data between a client and a server using JavaScript object notation, and since the JSON file is a widely used format, a detailed description thereof will be omitted.

According to an aspect of the disclosure, the contextualization storage unit 160 may store the list of detected objects and the object contextualization data for each frame as the text file in the form of an XML file. XML is an abbreviation of extensible markup language, and is a language that describes a structure of data using tags, wherein free tag definition, that is, tag extension is possible. Since the XML file is also a widely used format for data exchange, a detailed description thereof will be omitted.

According to an additional aspect of the present disclosure, the contextualization storage unit 160 may additionally classify the object contextualization data for each video file and store the classified data in the form of a text file. That is, in the example of FIG. 3, the contextualization storage unit may additionally store the object contextualization data for frames belonging to respective video files for $FILE_1$, $FILE_2$, $FILE_3$, and $FILE_4$.

According to an additional aspect of the present disclosure, the object contextualization server 100 may further include a clip designation unit 150, and the clip designation unit 150 configures a logical clip based on predetermined clip configuration information to add the configured result to the object contextualization data.

The clip designation unit 150 configures the logical clip in all or some frames of the input video data, and adds logical clip configuration information, that is, a logical clip ID, to the object contextualization data of the frame constituting the logical clip. The frame included in one logical clip may also be included in another logical clip. That is, one frame may belong to multiple logical clips.

For example, the clip configuration information may be information including the number of frames constituting the logical clip. In this case, the clip designation unit 150 configures consecutive frames corresponding to the number of frames included in the clip configuration information with respect to all frames of the input video data as logical clips, and adds the configures result to the object contextualization data. For example, when the number of frames included in the clip configuration information is 20, the clip designation unit 150 generates the logical clip by dividing all frames of the input video data into 20 frames, and adds a logical clip ID to which the corresponding frame belongs, to the object contextualization data of all frames.

As another example, the clip configuration information may be information including a logical clip list divided into a start frame ID and an end frame ID. In this case, the clip designation unit 150 configures frames corresponding to the logical clip list included in the clip configuration information into logical clips, and adds the configured result to the object contextualization data. For example, when the logical clip list included in the clip configuration information is $CLIP_1$ (20, 40) and $CLIP_2$ (70, 100), $CLIP_1$ is from frame #20 to #40, and $CLIP_2$ is from frame #70 to #100. Here, the clip designation unit 150 adds the logical clip ID to which the corresponding frame belongs, to the object contextualization data of the frames included in the corresponding logical clips.

The logical clip list included in the clip configuration information is arbitrarily configured by the user, and it is preferable that the related video frames are designated as logical clips. The logical clips may also be generated using a separate deep learning model that analyzes the video to classify relevant frames or a video analysis tool.

As another example, the clip configuration information may be information including a logical clip list divided into a start time and an end time. The video file input to the object contextualization server 100 of the present disclosure may include video capturing time information. In this case, the clip designation unit 150 configures frames of video capturing time corresponding to the logical clip list included in the clip configuration information as logical clips, and adds the configured result to the object contextualization data. For example, when the logical clip list included in the clip configuration information corresponds to $CLIP_1$ (start time 1, end time 1) and $CLIP_2$ (start time 2, end time 2), $CLIP_1$ is configured with frames whose capturing time is between start time 1 and end time 1, and $CLIP_2$ is configured with frames whose capturing time is between start time 2 and end time 2. Here, the clip designation unit 150 adds a logical clip ID to which the corresponding frame belongs, to the object contextualization data of the frame included in the corresponding logical clips.

FIG. 3 illustrates an example in which a clip designation unit configures a logical clip according to clip configuration information configured for the frame of the input video data and adds the configuration result to the object contextualization data. In the example of FIG. 3, a total of three logical clips are configured, $CLIP_1$ is designated in some frames of $FILE_1$, $CLIP_2$ is designated continuously over $FILE_1$ and $FILE_2$, and $CLIP_3$ is separately designated in $FILE_3$ and $FILE_4$.

Figure 5:
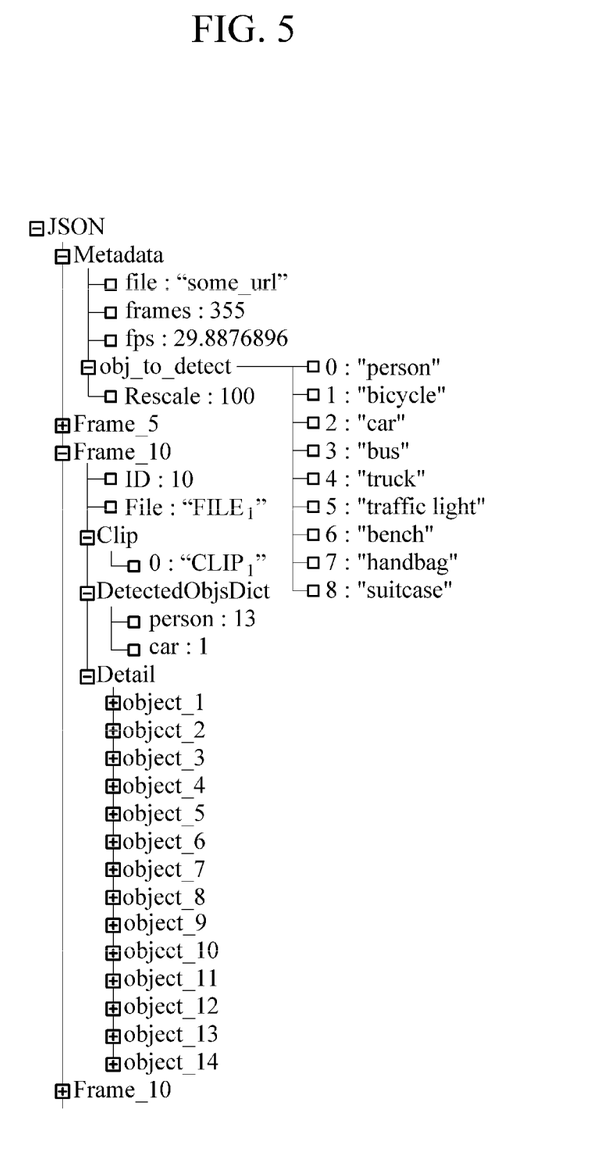
FIG. 5 illustrates an example in which an object contextualization server according to the present disclosure performs object contextualization on one or more video files.
Figure 6:
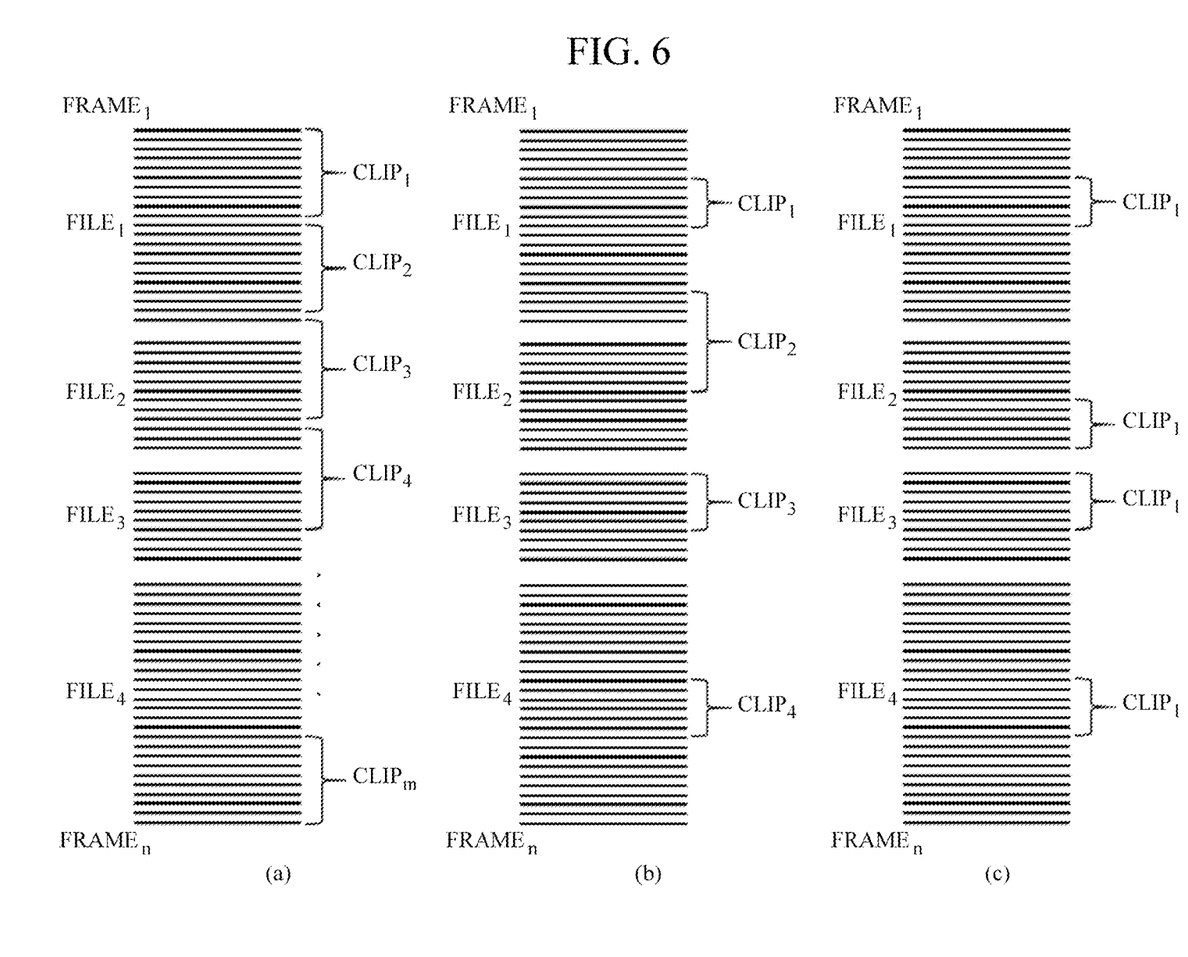
FIG. 6 illustrates examples of logical clip configuration of an object contextualization server according to the present disclosure.

FIG. 5 illustrates an example in which an object contextualization server according to the present disclosure performs object contextualization on one or more video files, and FIG. 6 illustrates examples of logical clip configuration of an object contextualization server according to the present disclosure.

The example shown in FIG. 5 is an example of structuring object contextualization data as a result of object contextualization performed on input video data. The object contextualization data includes list information obj_to_detect of objects detected in a corresponding video and frame contextualization data for each frame in which the object is detected.

In the example shown in FIG. 6A, the clip configuration information includes the number of frames, and logical clips are generated from $CLIP_1$ to $CLIP_m$ for all frames by dividing the logical clips by the number of frames. In the example shown in FIG. 6B, the clip configuration information includes a list of four logical clips divided into a start frame ID and an end frame ID and $CLIP_1$ to $CLIP_4$ are generated for a designated frame. In the example shown in FIG. 6C, the clip configuration information includes a logical clip list divided into a start time and an end time, and frames in which the capturing time of a frame in each video is included between the start time and end time of the clip configuration information are configured as a logical clip $CLIP_1$ (an example in which the logical clip list includes only one logical clip).

At least some of the clip designation unit 150 is implemented as computer program instructions to be stored in the memory and executed in the processor.

The object attribute information included in the frame contextualization data generated by the object contextualization server 100 may further include an object image in the corresponding frame. More specifically, the object attribute information generated by the object detection unit 120 may further include the object image in the corresponding frame. The object detected by the object detection unit 120 is displayed as a bounding box. The object detection unit 120 may extract the object image within the bounding box and may allow the extracted object image to be included in the object attribute information. After the object image included in the object attribute information by the object detection unit 120 is stored in a separate storage location, the storage path may be included in the object attribute information, and the object image may be encoded in the form of text and may be included in the object attribute information. The object image included in the object attribute information is included in the object contextualization data.

The video search server 200 receives a search condition and searches for a video that meets the search condition based on text search with respect to the object contextualization data.

The search condition may be the types and number of objects to be searched for. In this case, the number of objects may be an exact number or may be within a specific range. For example, a condition for searching for a video in which 10 or more cars appear may be configured. The search condition may include object attributes of the object to be searched for. For example, a condition for searching for a video in which a red car appears may be configured. In addition, the search condition may include logical operators for a plurality of conditions.

The video search server 200 does not analyze and search for an actual video, but may perform text-based search on the object contextualization data, which is text data such as a JSON or XML file format generated by contextualizing objects appearing in the video.

Since the video search system 10 of the present disclosure does not search for a video only when the original video is continuously stored, the video may be deleted according to the video retention period policy. For example, in the case where the video search system 10 of the present disclosure is performed with respect to a plurality of CCTV videos, even when the video is deleted because the CCTV video retention period has elapsed, the video may be searched through the video search system 10 of the present disclosure. Even when the video has been deleted, the video search system of the present disclosure may restore a video, from which a part of the background has been deleted, using images of objects detected in each frame as object attribute. Therefore, the video search system 10 of the present disclosure does not need to continuously store a video in order to search for the video, so that a problem of continuously increasing the storage capacity may not occur.

Figure 7:
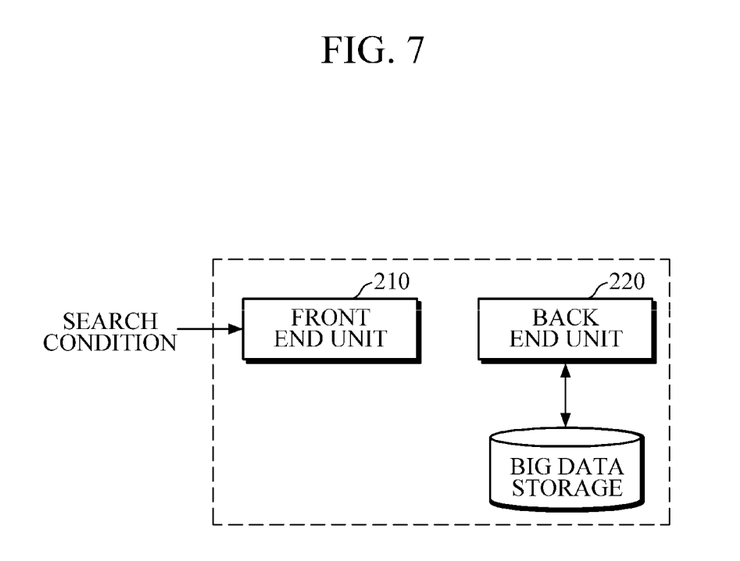
FIG. 7 is a block diagram illustrating a video search server according to the present disclosure.

Specifically, the video search server 200 according to an aspect of the present disclosure may include a front end unit 210 and a back end unit 220.

At least some of the front end unit 210 and the back end unit 220 are implemented as computer program instructions to be stored in the memory and executed in the processor.

The front end unit 210 provides a graphic-based user interface, particularly, a web-based user interface. The user interface for inputting search conditions provided by the front end unit 210 may be an interface for inputting search conditions in the form of text, and may be, in the case of a search only for a specific video file, an interface in which a list of objects appearing in the corresponding video files is provided so that the corresponding object, the number of objects, or a range of the number of objects can be designated. However, the present disclosure is not limited thereto.

In addition, the front end unit 210 provides a user interface for displaying search results. The user interface displaying the search results is a user interface displaying a list of searched videos, and a corresponding video may be selected from the list and may be reproduced from a frame that meets a search condition. In the list of searched videos, the same video may be repeatedly displayed, and in this case, video frames meeting the search condition are overlappingly present in one video.

The front end unit 210 may further provide a user interface for reproducing a video. The user interface for reproducing the video reproduces a video selected from the search result and displays a list of objects appearing in each frame of the video and a change in the number of objects.

The back end unit 220 searches for a video based on an input condition with respect to text files in which object contextualization data is stored. As described above, the back end unit 220 does not analyze and search for an actual video, but performs text-based search with respect to the previously generated object contextualization data.

According to an additional aspect of the present disclosure, the front end unit 210 of the video search server 200 may further provide a user interface for re-searching for a video based on the video search result after receiving a search condition. As to the search condition, a search may be performed with a plurality of conditions at once using a logical operator, but an additional search condition may be input to videos in which a search has been completed under a specific condition so that a search can be performed only with respect to the corresponding videos. Even in this case, the back end unit 220 may perform a text-based search with respect to the object contextualization data for the corresponding videos.

According to an additional aspect of the present disclosure, the front end unit 210 of the video search server 200 may further provide a user interface for receiving a list of video files to be searched for and transmitting the list to the object contextualization server 100. In this case, the object contextualization server 100 may perform object contextualization on the video file belonging to the received image file list.

That is, the video search system 10 of the present disclosure may search for the video in a state in which the video to be searched is limited by designating video files that the user wants to search for.

In this case, the back end unit 220 may search for the video only for the object contextualization data generated from the video files belonging to the input video file list.

The video search system 10 of the present disclosure does not continuously store the original video. Since the original video file may be deleted according to the video retention period policy, there may be no video to be reproduced even when the video is searched for based on the object contextualization data.

To reproduce the video even in such a situation, the video search system 10 of the present disclosure may allow the object image in the corresponding frame to be included in the object attribute information included in the frame contextualization data generated by the object contextualization server 100.

In this case, even when the video has been deleted, the video search server 200 of the present disclosure can restore the video, from which some of the background has been deleted, using images of the objects detected in each frame as the object attribute. That is, when the searched video file is deleted, the video search server 200 can generate a restored video file by combining the object images included in the object attribute information.

Figure 8:
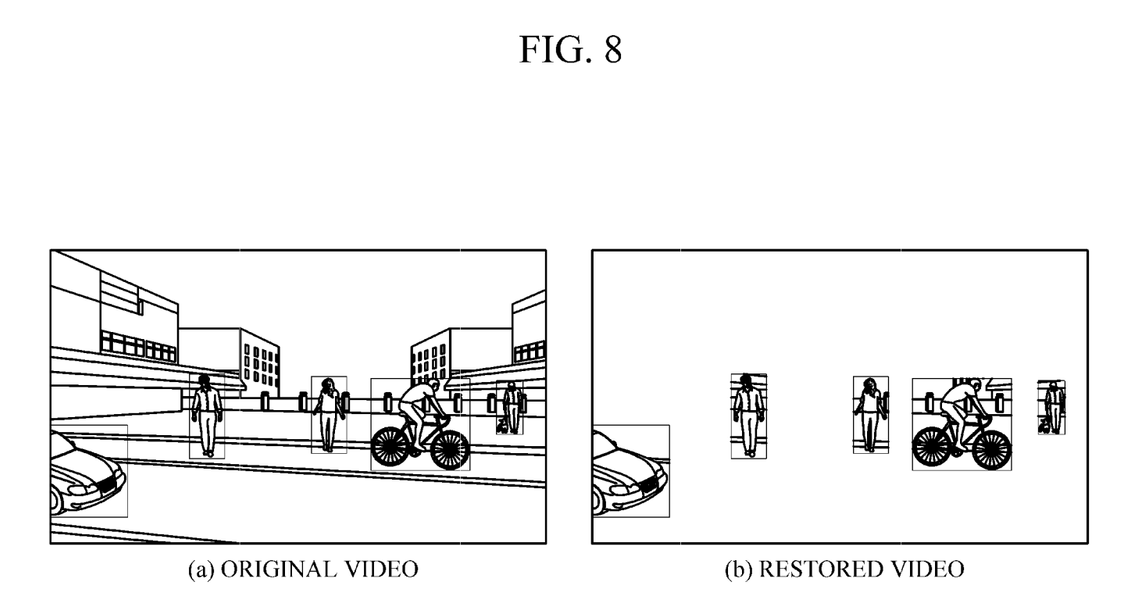
FIG. 8 illustrates examples in which a video search server of the present disclosure restores a deleted video using object attribute information.

FIG. 8 illustrates examples in which a video search server of the present disclosure restores a deleted video using object attribute information. FIG. 8A is an original video frame, and FIG. 8B is a restored video frame. FIG. 8B is an image in which all parts other than the object detected in the original image frame are removed.

According to the present disclosure, it is possible to contextualize and store an object appearing in the video and attribute of the object in the form of text to search for the video based on the text.

In addition, according to the present disclosure, it is possible to search even for a video deleted due to expiration of a storage period, etc., reconfigure the searched video into images of the detected objects, and reproduce the images.

In the above, the present disclosure has been described through embodiments with reference to the accompanying drawings, but is not limited thereto, and should be interpreted to cover various modifications that can be obviously derived by those skilled in the art. The claims are intended to cover such modifications.

[Description of reference numerals]

10: video search system
100: object contextualization server
110: input video processing unit
120: object detection unit
130: frame contextualization unit
140: object contextualization unit
150: clip designation unit
160: context storage unit
200: object search server
210: front end unit
220: back end unit

What is claimed is:

1. A video search system using object contextualization, comprising:
    an object contextualization server configured to detect an object for each frame from an input video file, generate frame contextualization data including types and the number of objects detected for each frame, object attribute information, and location information of the object, and combine the frame contextualization data to generate object contextualization data for video data and store the generated object contextualization data as a text file in a big data storage; and
    a video search server configured to receive a search condition and search for a video that meets the search condition based on text search with respect to the object contextualization data.

2. The video search system of claim 1, wherein the video search server includes:
    a front end unit configured to provide a user interface for inputting a search condition and a user interface for displaying a search result; and
    a back end unit configured to search for a video based on an input condition with respect to text files in which the object contextualization data is stored.

3. The video search system of claim 2, wherein the front end unit further provides a user interface for re-searching for a video with respect to a video search result after receiving the search condition.

4. The video search system of claim 2, wherein the front end unit further provides a user interface for receiving a list of video files to be searched and transmitting the list to the object contextualization sever, and the object contextualization server performs object contextualization with respect to the video files belonging to the transmitted video file list.

5. The video search system of claim 4, wherein the back end unit searches for a video only with respect to the object contextualization data generated from the video files belonging to the input video file list.

6. The video search system of claim 1, wherein the object contextualization server includes:
an input video processing unit configured to generate input video data by allocating consecutive frame identifiers to each frame of one or more video files;
an object detection unit configured to detect a plurality of objects for each frame from the input video data using a deep learning model, classify the types of the objects, and generate object attribute information including the types of the objects and location information of the object;
a frame contextualization unit configured to generate frame contextualization data including frame information detected for each frame in which the object is detected, the types and number of objects, and object attribute information of each object;
an object contextualization unit configured to generate object contextualization data including a list of detected objects and the frame contextualization data for each frame; and
a contextualization storage unit configured to store the object contextualization data as a text file in a big data storage.

7. The video search system of claim 6, wherein the object contextualization server further includes a clip designation unit configured to configure a logical clip based on configured clip configuration information and add the configured result to the object contextualization data.

8. The video search system of claim 6, wherein the frame contextualization unit generates the frame contextualization data for each frame at a predetermined frame interval.

9. The video search system of claim 6, wherein, when the types and number of objects detected for a current frame are different from the types and number of objects detected for a previous frame, the frame contextualization unit generates the frame contextualization data for the current frame.

10. The video search system of claim 1, wherein the object attribute information included in the frame contextualization data generated by the object contextualization server further includes an object image in the corresponding frame.

11. The video search system of claim 10, wherein, when the video file searched by the video search server is deleted, a restored video file is generated by combining the object images included in the object attribute information.

* * * * *